UNITED STATES PATENT OFFICE.

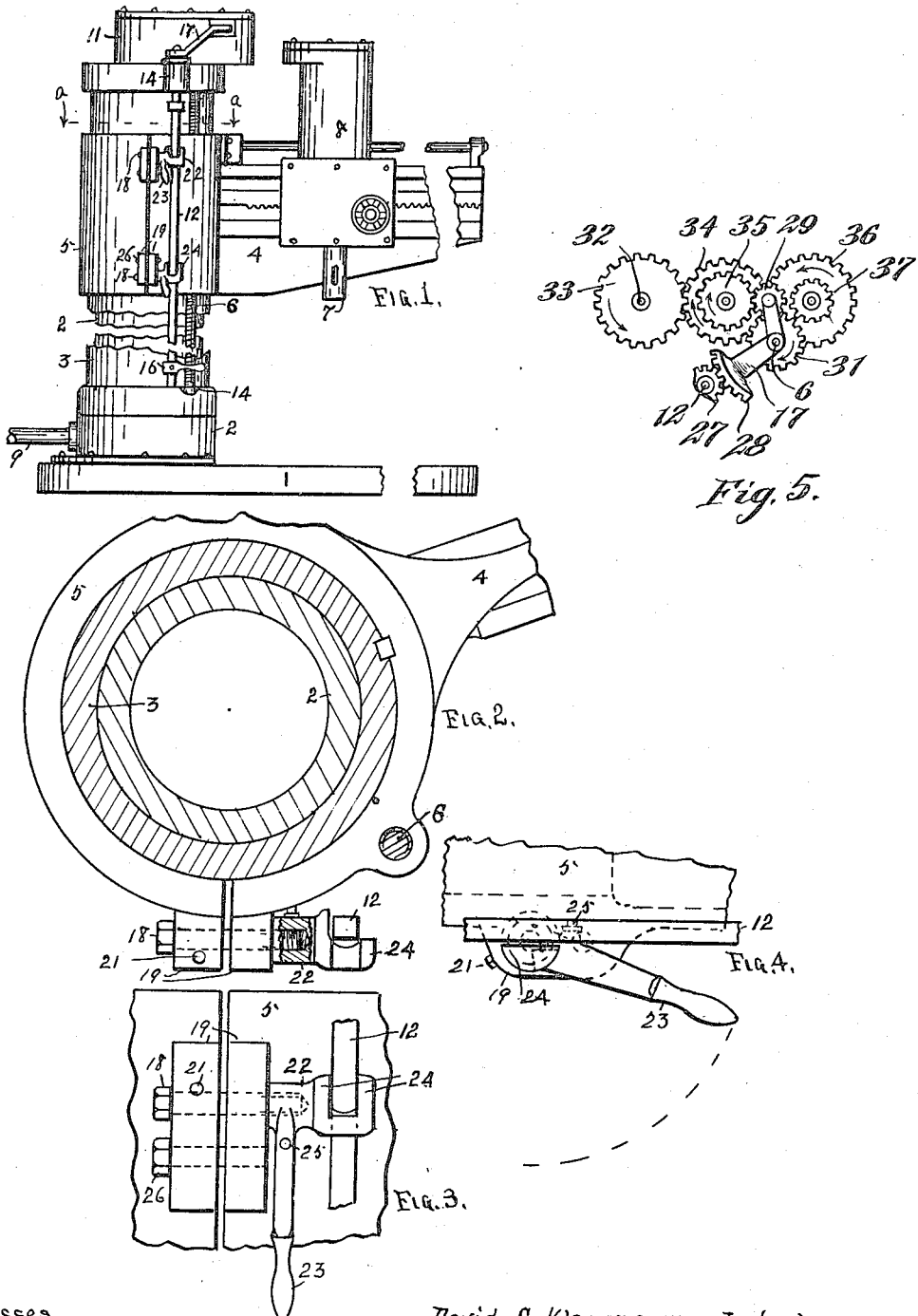

DAVID C. KLAUSMEYER, OF NORWOOD, OHIO, ASSIGNOR TO THE CINCINNATI-BICKFORD TOOL COMPANY, OF CINCINNATI, OHIO, A CORPORATION OF OHIO.

COMBINED LOCKING AND CLAMPING DEVICE.

1,140,906.    Specification of Letters Patent.    Patented May 25, 1915.

Application filed September 10, 1913. Serial No. 789,182.

*To all whom it may concern:*

Be it known that I, DAVID C. KLAUSMEYER, a citizen of the United States, residing at Norwood, Hamilton county, Ohio, have invented a new and useful Improvement in Combined Locking and Clamping Devices, of which the following is a specification.

My invention relates to combined locking and clamping devices adapted to the use of radial drills or other suitable purposes, and the objects of my improvement are to provide means for preventing the engagement of the shifting mechanism of two relatively movable members while they are securely clamped together, and to provide simple and durable construction and assemblage of parts for securing convenience for the operator, facility of operation and efficiency of action. These objects may be attained in the following described manner as illustrated in the accompanying drawings, in which:

Figure 1 is a front elevation of a radial drill provided with my improved locking and clamping device; Fig. 2, a horizontal section on the line a—a of Fig. 1, Figs. 3 and 4, front and side elevations respectively of the clamping and releasing lever with its connections, and Fig. 5, a plan of the driven gear connections with the adjusting screw for the radial arm.

In the drawings, 1 represents the base of a radial drill, 2 the column thereon, 3 the sleeve rotatively supported on the column, 4 the radial arm formed with the split collar 5 whereby it may be splined on the sleeve and movable longitudinally thereon by means of the screw 6, 7 the spindle, 8 the spindle gear box adjustable on the radial arm, 9 the driving shaft, 11 the gear box mounted on the column for the driving gears and for the shifting gears for the elevating screw 6 which may be thrown into or out of engagement by means of the shifting rod 12 and its connections therewith, all being constructed and arranged in the ordinary manner.

The shifting rod 12 preferably rectangular in cross section and journaled in bearings 14 formed on the sleeve 3 is provided with a hand lever 16 and with a pinion 27. A lever 17 formed with a rack 28 in engagement with said pinion is fulcrumed on the screw 6 and provided with a pinion 29 in engagement with the gear 31 secured on said screw. The vertical shaft 32 provided with gear 33 is driven from shaft 9 by means of bevel gears (not shown). Gear 34 engaging with gear 33 carries the small gear 35 and gear 36 engaging with gear 34 carries the small gear 37. The rotative movement of the shifting rod 12 with the pinion 29 actuates the rack 28 with the lever 17 to move the pinion 29 into engagement with either of the gears 35 or 37 for driving the gear 31 with the screw 6 in either of respective opposite directions for adjusting the arm 4 on the sleeve 3 as desired. The clamping screws 18 inserted through corresponding lugs 19 formed on the split collar 5 may be adjustably secured therein by means of the set screws 21. The clamping nuts 22 adjustably threaded on said screws are each formed with a handle 23 and with parallel jaws 24 projecting from one side adapted to detachably engage with the respective opposite sides of the shifting rod 12 to prevent it from being turned. Adjusting screws 25 in the handles 23 by contact with the wall of the sleeve 5 limit the movement of the handles in releasing the collar from the sleeve simultaneously with the disengagement of the parallel jaws 24 from the shifting rod 12. Cap screws 26 adjustably secured in the lugs 19 serve to limit the expansion of the split collar 5 when the clamping screws 18 are released.

In operation, the clamping nuts may be turned with the handles in an upward direction for simultaneously clamping the split collar and engaging the parallel jaws with the rectangular shifting rod to lock it from being turned. When the clamping nuts are released by a downward movement of the handles the parallel jaws thereon are simultaneously disengaged from the shifting rod as shown in Figs. 2, 3, and 4 that it may be turned by means of the handle thereon for engaging or disengaging the elevating screw with its driving mechanism. In this manner it becomes impossible to actuate the elevating screw while the collar is clamped on the sleeve, and breakage of the parts is thus avoided. The clamping screws may be turned and secured by means of the set screws in the lugs for securing the proper position of the jaws in relation to the shifting rod when the necessary clamping force is exerted.

Having fully described my improvement, what I claim as my invention and desire to secure by Letters Patent of the United States is:

1. The combination of a vertical column, a sleeve rotatively supported thereon, a radial arm splined on the sleeve, power actuated screw connections for moving the arm longitudinally on the sleeve, a shifting rod for said connections, clamping screws for immovably securing the arm on the sleeve, and connections therewith for simultaneously locking the shifting rod with the mechanism out of action.

2. The combination of a member, a split collar splined thereon, mechanism for adjusting the collar on the member, a rectangular shifting rod for controlling said mechanism, a clamping screw for the collar and formed with parallel jaws arranged to engage with the shifting rod for locking it out of action during the clamping engagement of the collar with said member, and for simultaneously disengaging the rod with the releasing of the collar from the member.

3. The combination with a support, a sleeve thereon, a collar splined on the sleeve, screw mechanism for adjusting the collar on the sleeve, a shifting rod for controlling said mechanism, means for immovably securing the collar on the sleeve and detachable connections therefrom with said rod for locking said rod with the mechanism out of action.

DAVID C. KLAUSMEYER.

Witnesses:
S. C. SCHAUER,
R. S. CARR.